United States Patent
Mostafa et al.

(10) Patent No.: US 6,987,974 B1
(45) Date of Patent: Jan. 17, 2006

(54) METHOD FOR ESTABLISHING A CALL IN THE PRESENCE OF OUTBAND INDICATION OF PSTN INVOLVEMENT AT MULTIMEDIA CALL SETUP

(75) Inventors: Miraj Mostafa, Tampere (FI); Harri Honko, Tampere (FI)

(73) Assignee: Nokia Corporation, Espoo (FI)

( * ) Notice: Subject to any disclaimer, the term of this patent is extended or adjusted under 35 U.S.C. 154(b) by 777 days.

(21) Appl. No.: 09/715,839

(22) Filed: Nov. 17, 2000

(30) Foreign Application Priority Data

Nov. 19, 1999  (CA) .............................................. 2290069

(51) Int. Cl.
*H04Q 7/20* (2006.01)

(52) U.S. Cl. ...................... 455/455; 455/560; 455/565; 370/351; 370/465; 370/522

(58) Field of Classification Search ................. 455/560, 455/565, 557, 455, 561, 445; 370/522, 524, 370/465, 351, 352, 353, 356, 329, 401, 354, 370/355

See application file for complete search history.

(56) References Cited

U.S. PATENT DOCUMENTS

| | | | |
|---|---|---|---|
| 5,572,524 A | * 11/1996 | Harada et al. .............. 370/468 |
| 6,091,968 A | * 7/2000 | Koohgoli et al. ............ 455/557 |
| 6,172,974 B1 | * 1/2001 | Tseng et al. ................. 370/357 |
| 6,256,512 B1 | * 7/2001 | Verdonk ................... 455/554.1 |
| 6,295,302 B1 | * 9/2001 | Hellwig et al. ............. 370/522 |
| 6,320,862 B1 | * 11/2001 | Nitta ........................... 370/401 |
| 6,343,118 B1 | * 1/2002 | Haster ..................... 379/93.06 |
| 6,373,930 B1 | * 4/2002 | McConnell et al. ... 379/114.28 |
| 6,424,832 B1 | * 7/2002 | Britt et al. ................ 455/432.1 |
| 6,434,139 B1 | * 8/2002 | Liu et al. .................... 370/352 |
| 6,434,385 B1 | * 8/2002 | Aucoeur ..................... 455/430 |
| 6,504,839 B2 | * 1/2003 | Valentine et al. ........... 370/354 |
| 6,600,740 B1 | * 7/2003 | Valentine et al. ........... 370/365 |

FOREIGN PATENT DOCUMENTS

WO   0119093   3/2001

* cited by examiner

*Primary Examiner*—Rafael Perez-Gutierrez
*Assistant Examiner*—Khawar Iqbal

(57) ABSTRACT

Forward/Backward Call Indicators and the Progress Indicator (PI) of ISUP messages are used in call control signals, such as for setting up a mobile multimedia call, to indicate the involvement of a Public Switched Telephone Network (PSTN) terminal. Either terminal of an end-to-end connection can initiate the call and likewise either can respond to the call control signals initiated by the other terminal to immediately recognize the unambiguous fact that a PSTN terminal is involved in the call and to immediately respond by correctly setting up an appropriate and compatible communication format.

4 Claims, 13 Drawing Sheets

| 8 | 7 | 6 | 5 | 4 | 3 | 2 | 1 | Octet |
|---|---|---|---|---|---|---|---|---|
| | Progress Indicator Information Element identifier | | | | | | | |
| 0 | 0 | 0 | 1 | 1 | 1 | 1 | 0 | 1 |
| Length of Progress Indicator contents | | | | | | | | 2 |
| ext. 1 | Coding standard | | Spare 0 | Location | | | | 3 |
| ext. 1 | Progress description | | | | | | | 4 |

| 8 | 7 | 6 | 5 | 4 | 3 | 2 | 1 | Octet |
|---|---|---|---|---|---|---|---|---|
| | Progress Indicator Information Element identifier | | | | | | | 1 |
| Length of Progress Indicator contents | | | | | | | | 2 |
| ext. 1 | Coding standard | | Spare 0 | Location | | | | 3 |
| ext. 1 | Progress description | | | | | | | 4 |

FIG. 5A

*Coding standard (octet 3)*

Bits
<u>7 6</u>
0 0    ITU-T standardized coding, as described below
0 1    ISO/IEC Standard (Note 1)
1 0    National standard (Note 1)
1 1    Standard specific to identified location (Note 1)

NOTE 1 – These other coding standards should be used only when the desired progress indication can not be represented with the ITU-T-standardized coding.

*Location (octet 3)*

Bits
<u>4 3 2 1</u>
0 0 0 0 User
0 0 0 1 Private network serving the local user
0 0 1 0 Public network serving the local user
0 0 1 1 Transit network (Note 2)
0 1 0 0 Public network serving the remote user
0 1 0 1 Private network serving the remote user
1 0 1 0 Network beyond the interworking point All other values are reserved.

NOTE 2 – This value may be generated by some networks.

NOTE 3 – Depending on the location of the users, the local public network and remote public network may be the same network.

FIG. 5B

*Progress description (octet 4)*

```
Bits
7 6 5 4 3 2 1    No.
0 0 0 0 0 0 1    1.  Call is not end-to-end ISDN; further call progress
                     information may be available in-band
0 0 0 0 0 1 0    2.  Destination address is non-ISDN
0 0 0 0 0 1 1    3.  Origination address is non-ISDN
0 0 0 0 1 0 0    4.  Call has returned to the ISDN
0 0 0 0 1 0 1    5.  Interworking has occurred and has resulted in a
                     telecommunication service change (Note 5)
0 0 0 1 0 0 0    8.  In-band information or an appropriate pattern is now
                     available
```

All other values are reserved.

NOTE 4 – The use of different progress descriptions is further explained in Annex G.

NOTE 5 – This progress description value shall be used only in the case of interworking in a full ISDN environment, e.g. when bearer capability selection is not supported or when resource or route of the preferred capability is not available. In case of interworking with a non-ISDN environment, a progress description No. 1 shall be used. If the destination address is non-ISDN, the progress description No. 2 shall be used.

> *Coding standard (octet 3)*
> Bits
> <u>7 6</u>
> 0 0   Standardized coding, as described in CCITT Rec. Q.931
> 0 1   Reserved for other international standards
> 1 0   National standard
> 1 1   Standard defined for the GSMβPLMNS as described below
>
> Coding standards other than "1 1 – standard defined for the GSMβPLMNS" shall not be used if the progress description can be represented with the GSMβstandardized coding.
>
> The mobile station or network need not support any other coding standard than "1 1 – standard defined for the GSMβPLMNS".
>
> If a progress indicator IE indicating a coding standard not supported by the receiver is received, progress description "Unspecific" shall be assumed.
>
> *Location (octet 3)*
> Bits
> <u>4 3 2 1</u>
> 0 0 0 0 User
> 0 0 0 1 Private network serving the local user
> 0 0 1 0 Public network serving the local user
> 0 1 0 0 Public network serving the remote user
> 0 1 0 1 Private network serving the remote user
> 1 0 1 0 Network beyond the interworking point
>
> All other values are reserved.
>
> Note: Depending on the location of the users, the local public network and remote public network may be the same network.

FIG. 6B

*Progress description (octet 4)*

```
Bits
7 6 5 4 3 2 1   No.
0 0 0 0 0 0 1   1.  Call is not end-to-end PLMN/ISDN; further call
                    progress information may be available in-band
0 0 0 0 0 1 0   2.  Destination address is non-PLMN/ISDN
0 0 0 0 0 1 1   3.  Origination address is non-PLMN/ISDN
0 0 0 0 1 0 0   4.  Call has returned to the PLMN/ISDN
0 0 0 1 0 0 0   8.  In-band information or an appropriate pattern is now
                    available
0 1 0 0 0 0 0   32. Call is end-to-end PLMN/ISDN
1 0 0 0 0 0 0   64. Queueing
All other values    Unspecific
```

| FIG. 6A |
|---------|
| FIG. 6B |

Initial Address Message (IAM)

Related coding of the Initial Address Message (IAM) according to the SETUP message is described hereafter.

Concerning Mandatory Parameters

Forward call indicators
bit I     ISDN access indicator
   0    *originating access non-ISDN*
   1    *originating access ISDN*

Concerning Optional Parameters

Access transport

Contents of the access transport parameter (Table 3/Q.699)

| SETUP→ | IAM→ |
|---|---|
| Content | Access transport parameter |
| Progress indicator | Progress indicator |
| High layer compatibility (Note) | High layer compatibility |
| Low layer compatibility | Low layer compatibility |
| NOTE – If two high layer compatibility information elements are received, they are transferred in the same order as received in the SETUP message in the access transport parameter of the initial address message. ||

Address Complete Message (ACM)

Concerning Mandatory Parameters

Backward call indicators
  bit   M         ISDN access indicator
  0              *terminatinf access non-ISDN*
  1              *terminating access ISDN*

Concerning Optional Parameters

Access transport
  This parameter carries the progress indicator information element possibly received from the called user (except the value No. 8).

FIG. 7B

Call Progress Message (CPG)

Concerning Optional Parameters

Backward call indicators
bit    M           ISDN access indicator
0            *terminatinf access non-ISDN*
1            *terminating access ISDN*

Access transport
This parameter carries the progress indicator information element possibly received from the called user (except the value No. 8).

Answer Message (ANM)

Concerning Optional Parameters

Backward call indicators
bit    M           ISDN access indicator
0            *terminatinf access non-ISDN*
1            *terminating access ISDN*

Access transport
This parameter carries the progress indicator information element possibly received from the called user (except the value No. 8).

| FIG. 7A |
|---|
| FIG. 7B |

FIG. 7

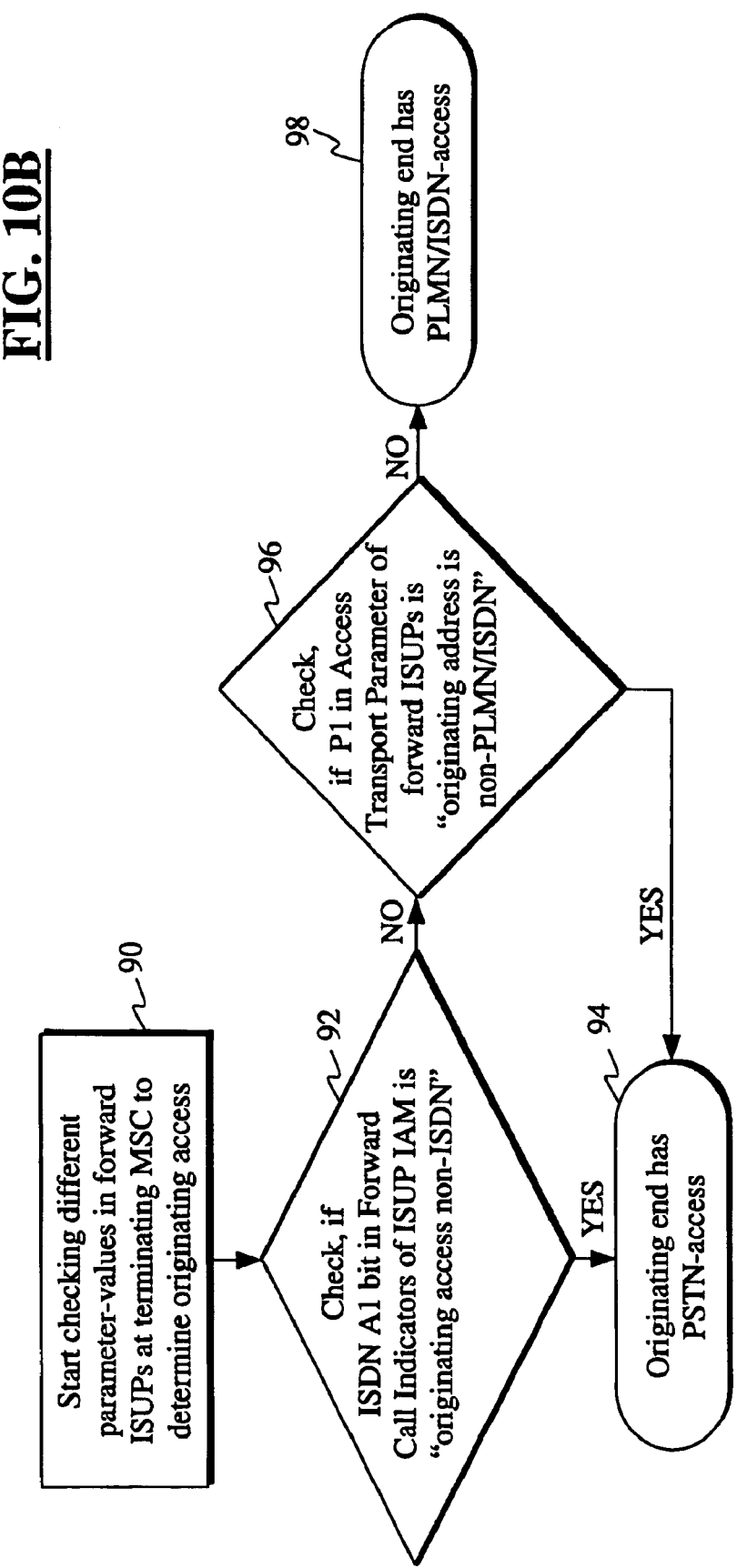

US 6,987,974 B1

METHOD FOR ESTABLISHING A CALL IN THE PRESENCE OF OUTBAND INDICATION OF PSTN INVOLVEMENT AT MULTIMEDIA CALL SETUP

TECHNICAL FIELD

The present invention relates to a method for identifying the type of telecommunications service required during call establishment over two networks. In particular, it relates to a method and apparatus for establishing call control appropriate to the telecommunications service identified by the originating/terminating network.

BACKGROUND OF THE INVENTION

Seamless integration and proper co-ordination of different applications, both new and existing, among different networks are prime objectives to achieve with the implementation of the forthcoming third generation (3G) mobile system. Multimedia is one of the new applications to be part of the mobile system and H.324 based 3G-324M videotelephony is agreed to be the multimedia solution for the circuit switched (CS) part of the system. Outband indication of the multimedia call during call setup is very important in this regard to invoke the application in the peer-end, include an Interworking Function (IWF) in switching nodes and, as a whole, properly co-ordinate the whole process of a systematic call setup. Conventional PSTN (Public Switched Telephone Network) circuits lack the feature of end-to-end digital transmission and thus need a different call setup procedure in terms of Bearer Capability (BC) negotiation compared to those required for an end-to-end digital connection, available in a PLMN (Public Land Mobile Network) and an ISDN (Integrated Services Digital Network) environment. Thus, the digital end should "know" if the peer-end resides in the PSTN during call setup. But the unique numbering system for both ISDN and PSTN makes it impossible to interpret this from the dialed numbers; thus some other means is required to let the other end know about the fact during call setup.

The 3 G system is expected to work based on the existing 2G system. Thus backward compatibility with minimal changes required in existing systems is of great importance.

As mentioned, the calling/called end does not "know" from the called/calling number if the peer-end is in PSTN. Due to the different nature of the transmitting characteristics available in PSTN circuits, the mobile multimedia connection needs a different type of Bearer Service (BS) from the connection where there is PSTN involvement. Without this indication and thus fallback to the service compatible for PSTN circuit, the call would not succeed regardless of whether the PSTN-end supports the application. If this were allowed to stand, it would limit the new multimedia applications within end-to-end PLMN/ISDN circuits, keeping PSTN, still the largest telecommunications network, completely isolated.

Another important issue in this regard is that practical implementations of both ISDN and PSTN circuits are subjected to variation from one service provider to other, and national restrictions and interests also make the scenario complex as a whole.

Multimedia is a new concept to Mobile environment and thus an inter-network multimedia call between mobile and PSTN environment is also a new issue.

However, there already exist a couple of ideas to recognize the involvement of a PSTN end terminal and thus solve the problem, which are discussed briefly below.

3 GPP TS 26.112 mentions one solution each for mobile originating (MO) and mobile terminating (MT) (single numbering) cases involving PSTN. For the MO case, it recommends that the Mobile Switching Center (MSC) or switching node look for a BC Information Element (IE) in all gradual backward outband setup messages (CALL PROCEEDING, ALERTING and CONNECT which reflect the backward ISUP (Integrated Services User Part) ACM (Address Complete Message), CPG (Call Progress) and ANM (Answer Message) messages) and assume the other end to be in the PSTN, if a BC IE is not available in any of these messages. For the single numbering MT case, TS 26.112 recommends to send the SETUP message with an empty BC IE from the terminating MSC to the terminating MS. Then the terminating MS should include a series of BC IEs, including the one for 3 G324M, in the backward setup message (CALL CONFIRMED) according to its own preference. However, backward setup messages might not carry BC IE even if the other end is in PLMN or ISDN (depending on implementation). Thus, following the solution mentioned for MO case in TS.26.112, the originating MSC might end up with a completely wrong decision. This is because the PSTN specific decision is taken in the originating MSC based on a non-PSTN specific result.

On the other hand, a very simple idea also being considered for the MO case w is to initiate fallback from a default BS (UDI/RDI) to PSTN compatible BS (3.1 kHz Ext. PLMN) by the originating MSC in case it finds no UDI/RDI connection with the peer-end. Getting no UDI/RDI (Unrestricted/Restricted Digital Information) connection, however, will close the call and thus virtually require initiating a new call with new service requirement.

Both the approaches for the MO case force a wait until the end to have a decision, resulting in considerable delay in the whole call setup process.

Furthermore, for the MT single-numbering case, a partial service definition from the ISDN or PLMN end might mislead the terminating MSC, leading to a false requirement to fallback to the PSTN case. Moreover, inclusion of a series of BC IEs in the backward CALL CONFIRMED message from the terminating MS is against the existing PLMN specification.

Finally, in any case of call termination involving the PSTN, according to approaches mentioned above, the fact of PSTN involvement is finally correctly known through inband modem negotiation. Due to the possibility of misleading information, as mentioned above, the inband modem negotiation might fail, forcing an illogical service charge to the user.

DISCLOSURE OF INVENTION

An object of the invention is to overcome the above described discontinuity between the PSTN and the PLMN/ISDN networks.

Another object is to provide a fast, backward compatible solution that requires little change to the overall system and works despite variations among different PSTN and ISDN implementations.

According to a first aspect of the present invention, a method for setting up a multimedia call between an originating or terminating mobile terminal and a corresponding terminating or originating nondigital public switched telephone network (PSTN) terminal via a mobile switching center (MSC) in a mobile telephone network, comprises the steps of:

checking parameter values in backward or forward ISDN user part (ISUP) messages at the MSC for originating or terminating non-ISDN access indicated by a PSTN local exchange (LE) connecting to the terminating or originating non-digital PSTN terminal, and setting up a compatible connection between the originating or terminating mobile terminal and the corresponding terminating or originating non-digital PSTN terminal via the MSC and the PSTN LE in the presence of the indication of the originating terminal or the terminating terminal connecting to the PSTN LE.

According further to the first aspect of the invention, the compatible connection is established by first connecting the intermediate MSC to the originating or terminating nondigital PSTN terminal with an analog connection for determining a data rate to use between the nondigital PSTN terminal and the mobile terminal, by second notifying the mobile terminal of the data rate and receiving agreement therefrom, and by third establishing the compatible connection as an analog connection with an agreed data rate between the nondigital PSTN terminal and the mobile terminal.

According to a second aspect of the present invention, a method for setting up a multimedia call between an originating mobile terminal and a terminating public switched telephone network (PSTN) non-ISDN terminal via an originating mobile switching center (MSC) in a mobile telephone network and via at least one PSTN local exchange (LE) including a terminating PSTN LE to which the PSTN terminal is connected, comprises the steps of:

initiating the multimedia call from the originating mobile terminal by providing an originating first forward message from the originating mobile terminal to the originating MSC, checking the originating first forward messages in the originating MSC for an indication of the multimedia call by the originating mobile terminal, providing, in response to the first forward message, a second forward message from the originating MSC to the terminating PSTN LE, providing, in response to the second forward message, a plurality of backward messages from the terminating PSTN LE connected to the terminating PSTN terminal to the originating MSC at least one of the plurality of backward messages indicating the PSTN non-ISDN terminal connected to the PSTN LE, and checking the backward messages from the terminating PSTN LE for the at least one of the plurality of backward messages indicating the presence of the PSTN non-ISDN terminal connected to the PSTN LE, setting up a compatible analog connection between the originating mobile terminal and the terminating PSTN non-ISDN terminal in the presence of the indication of the terminating PSTN non-ISDN terminal connecting to the PSTN LE.

In further accord with the second aspect of the invention, the compatible analog connection is setup by first connecting the intermediate MSC to the terminating PSTN non-ISDN terminal with an analog connection for determining a data rate to use between the terminating PSTN non-ISDN terminal and the mobile terminal, by second notifying the originating mobile terminal of the data rate and receiving agreement therefrom, and by third setting up the compatible analog connection with an agreed data rate between the terminating PSTN non-ISDN terminal and the originating mobile terminal.

According to a third aspect of the present invention, a method for setting up a multimedia call between a terminating mobile terminal and a corresponding originating public switched telephone network (PSTN) non-ISDN terminal via at least one terminating mobile switching center (MSC) in a mobile telephone network and at least one PSTN local exchange (LE) connected to the originating PSTN non-ISDN terminal, comprises the steps of:

initiating the multimedia call from the originating PSTN non-ISDN terminal connected to the PSTN LE and providing a first forward message from the PSTN LE to the terminating MSC, checking the first forward message in the terminating MSC for an indication of the multimedia call from the PSTN LE connected to the originating PSTN terminal, and setting up a compatible connection between the originating PSTN terminal and the terminating mobile terminal in the presence of the indication of the originating PSTN terminal connected to the PSTN LE.

Further according to the third aspect of the invention, the compatible connection is set up by first connecting the intermediate MSC to the originating PSTN non-ISDN terminal with an analog connection for determining a data rate to use between the originating PSTN non-ISDN terminal and the terminating mobile terminal, by second notifying the mobile terminal of the data rate and receiving agreement therefrom, and by third setting up the compatible connection as an analog connection with an agreed data rate between the originating PSTN non-ISDN terminal and the terminating mobile terminal.

The invention takes advantage of the fact that a multimedia call is subject to a series of outband message transactions within the PLMN/ISDN environment.

As the PSTN lacks the feature of outband signalling, and so as not to exclude calls connecting via the PSTN, a PLMN/ISDN node is given the responsibility during setup, according to the invention, to sense if the prospective connection for that particular call involves an end user using a PSTN terminal connecting to the PLMN/ISDN node via a switching node (which may be a PSTN node, an ISDN node, an MSC, or the like). In that case, according to the invention, the switching node should include a signalling parameter in a suitable message in the forward/backward direction to let the digital end know about the nature and point of discontinuity using outband signalling. This way the PLMN/ISDN end can fallback to the situation required for PSTN interoperability using the correct bearer service at the time of making the connection. Thus, a fallback from a UDI/RDI connection, required for end-to-end PLMN/ISDN connection, to a 3.1 kHz Ext. PLMN connection, required for a connection involving the PSTN, can be initiated by the switching node automatically and without making a false start.

There exist signalling parameters in both the PLMN (radio interface) and ISDN (user-network interface) to be used for the purpose mentioned above, i.e., the Progress Indicator (PI). The PI Information Element (IE) can indicate the location and the type of discontinuity in the coded octets, as mentioned in ITU-T Q.931, GSM 04.08 and UMTS 24.008. Most of the outband ISDN/PLMN network CC (Call Control) messages used for call setup can include PI IE. The information can be mapped to/from ISUP (Integrated Services User Part) network messages ensuring proper relay of the information to the end. At the same time, these ISUP messages can also relay the information about terminating/originating access of the connection in the mandatory Forward/Backward Call Indicator Parameter. So, using existing outband signalling features, mobile multimedia calls can be coordinated while interworking with PSTN terminals.

The main advantage of the invention is the ISDN/PLMN-end "knows" about the involvement of the PSTN terminal during an outband setup procedure and thus the ISDN/PLMN node can initiate automatic fallback to modify the setup to be compatible with the PSTN (3.1 kHz Ext. PLMN). There is no confusion or any possibility of the digital network switching node being misled by information about the BS requirement by different ends regardless of whether it is a MO or a MT case involving a PSTN terminal.

For both MO and MT cases, the MS does not need to know about the network status of the peer-end. The MS always approaches multimedia calls with the usual service definition (UDI/RDI) and a subsequent indication received during setup of a PSTN connection as the end peer automatically allows for a smooth fallback to the PSTN specific service (3.1 kHz) requirement.

The PLMN end knows about PSTN involvement via/through outband signalling and thus the possibility of a failing inband modem negotiation is reduced and consequently users are not subjected to unexpected charges.

For a MO case, the originating MSC does not need to wait until the end of the outband setup procedure to "know" about the presence of a PSTN local exchange and thus call setup time is also reduced.

The signalling parameter to be used in this approach is already defined in PLMN and ISDN Recommendations and thus it should be backward compatible with already existing networks.

BRIEF DESCRIPTION OF THE DRAWINGS

Embodiments of the present invention will now be described, by way of example, with reference to the accompanying drawings, of which:

FIG. 5 shows how FIGS. 5A and 5B fit together.

FIGS. 5A and 5B together show coding details of the PI IE of FIG. 3.

FIG. 6 shows how FIGS. 6A and 6B fit together.

FIGS. 6A and 6B together show coding details of the PI IE of FIG. 4.

FIG. 7 shows how FIGS. 7A & 7B fit together.

FIGS. 7A and 7B together show Access Indicator and Progress Indicator in Integrated Services User Part (ISUP) messages, according to the prior art.

FIG. 10B shows a flow chart for checking different parameters in forward ISUPs in a terminating MSC, according to the present invention, for determining the nature of the access at the originating end, especially for a PSTN-originated call.

BEST MODE FOR CARRYING OUT THE INVENTION

Figure 1:
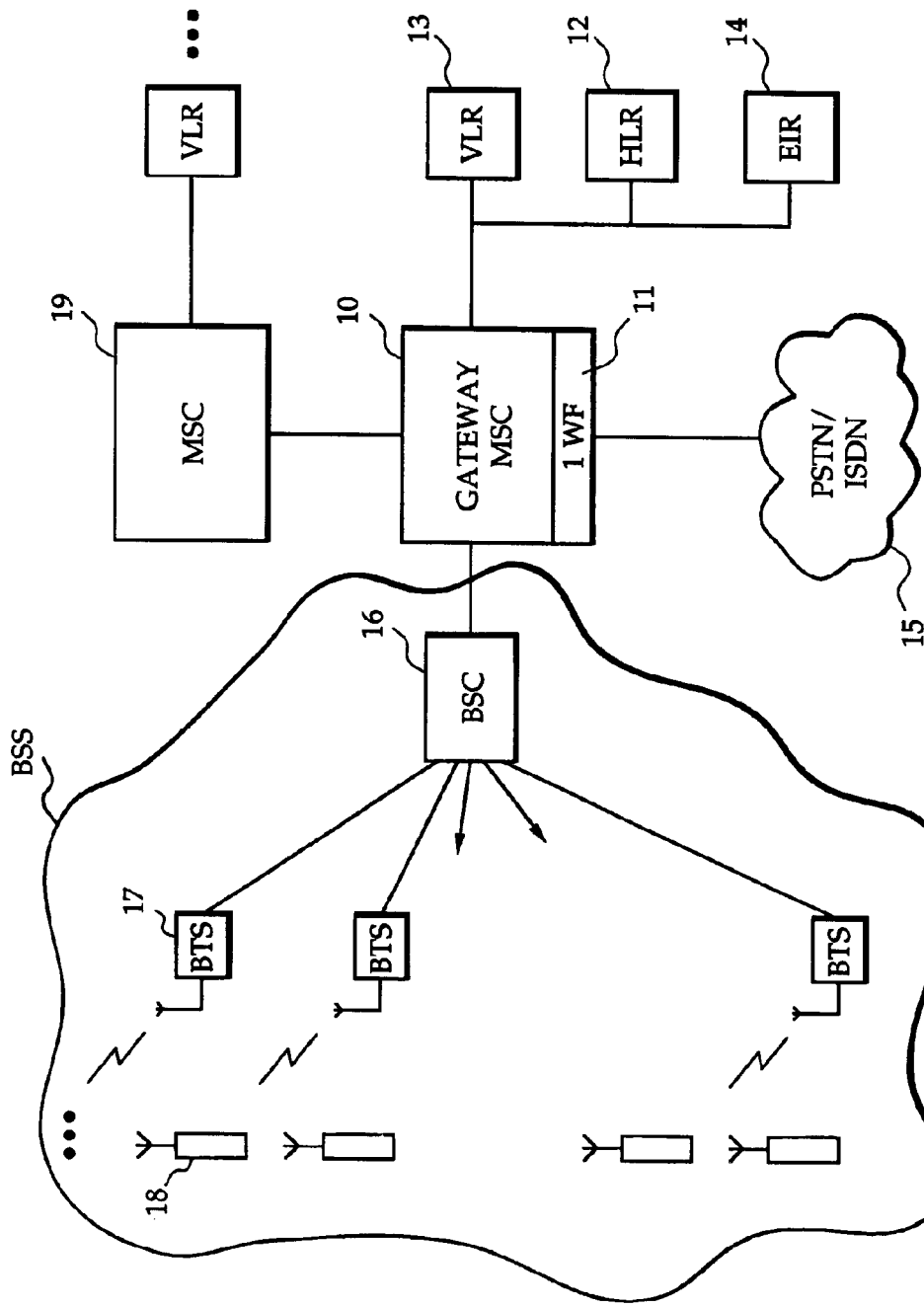
FIG. 1 illustrates the prior art GSM PLMN and its connection to the PSTN/ISDN.

As can be seen from FIG. 1, the GSM architecture comprises a gateway mobile switching center (GMSC) 10 which interfaces with fixed networks such as the PSTN 15 and a GSM radio network. A gateway is a node interconnecting the two networks. The GMSC is the interface between the W mobile cellular network and the PSTN. It is in charge of routing calls from the fixed network towards a GSM user. The GMSC is often implemented the in the same node as one of a plurality of mobile switching centers (MSCs) connected together. The GSM radio network comprises Base Station Subsystems (BSS) comprising a Base Station Controller (BSC) 16 and Base Transceiver Stations (BTS) 17. Mobile stations 18 are coupled to the BTSs via an air interface. The gateway MSC is also connected to subscriber and terminal equipment databases in the form of a Home Location Register (HLR) 12, Visitor Location Register (VLRi) 13, and Equipment Identity Register (EIR) 14. The HLR is a very important database that stores information of the subscribers belonging to the covering area of a MSC. It also stores the current location of these subscribers and the services to which they have access. The location of the subscriber corresponds to the SS7 address of the Visitor Location Register (VLR) associated to the terminal. The VLR contains information from a subscriber's HLR necessary in order to provide the subscribed services to visiting users. When a subscriber enters the covering area of a new MSC, the VLR associated to this MSC will request information about the new subscriber to its corresponding HLR. The VLR will then have enough information in order to assure the subscribed services without needing to ask the HLR each time a communication is established. The VLR is always implemented together with a MSC; so the area under control of the MSC is also the area under control of the VLR. An Authentication (AuC) register (not shown) is used for security purposes. It provides the parameters needed for authentication and encryption functions. These parameters help to verify the user's identity. The Equipment Identity Register (EIR) is also used for security purposes. It is a register containing information about the mobile equipments. More particularly, it contains a list of all valid terminals. A terminal is identified by its International Mobile Equipment Identity (IMEI). The EIR allows the prohibition of calls from stolen or unauthorized terminals (e.g, a terminal which does not respect the specifications concerning the output RF power). The EIR contains information relating to the mobile terminals and the VLR provides a local store of all the information required to handle calls to and from mobile users in the location area relating to that particular VLR. Since the PSTN is an analog network and the GSM PLMN is digital, they are not directly compatible. Hence, the gateway MSC 10 has an associated interworking function (IWF) 11, which is a functional entity enabling interworking between the PLMN and PSTN.

As mentioned in the Background section above, for a new service such as multimedia, the calling/called end does not "know" from the called/calling number if the peer-end is in the PSTN. Due to the different nature of the transmitting characteristics available in PSTN circuits, the mobile multimedia connection needs a different type of Bearer Service (BS) from the connection where there is PSTN involvement. Without this indication and thus fallback to the service compatible for PSTN circuit, the call would not succeed regardless of whether the PSTN-end supports the application. If this were allowed to stand, it would limit the new multimedia applications within end-to-end PLMN/ISDN circuits, keeping PSTN, still the largest telecommunications network, completely isolated.

Figure 2:
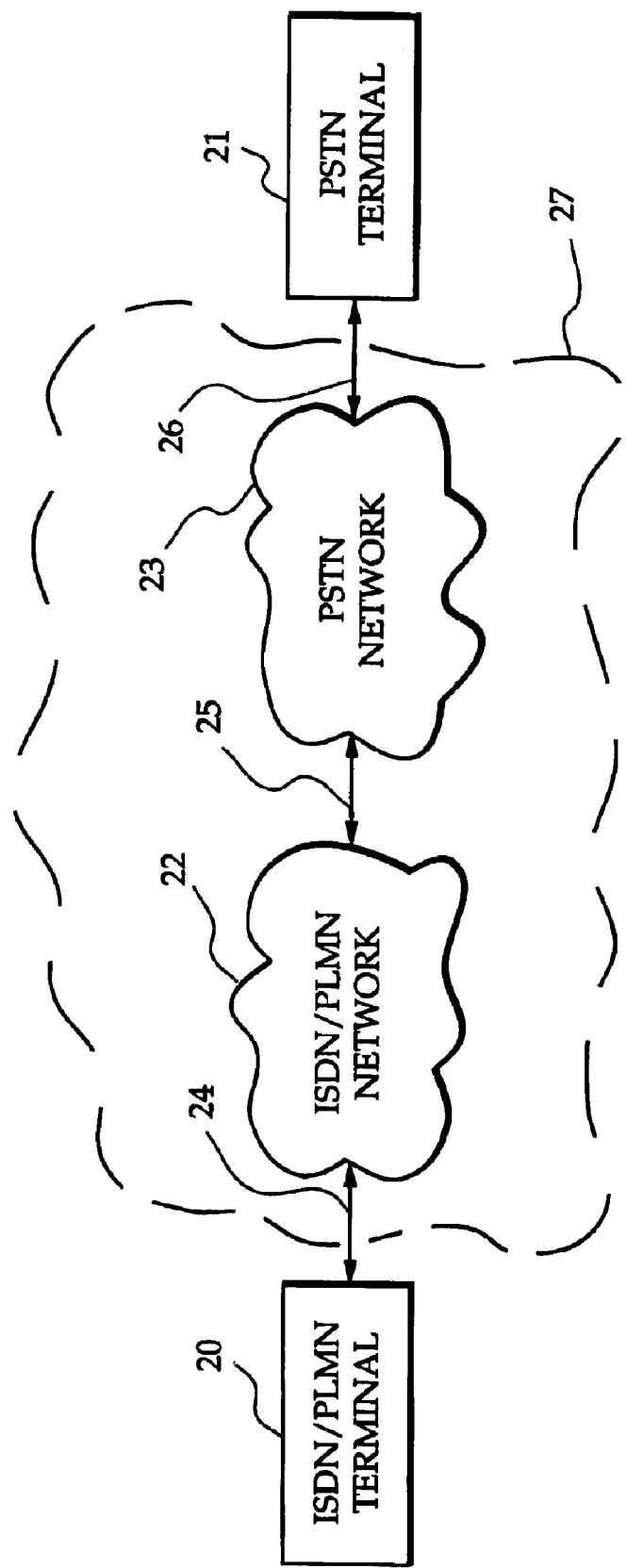
FIG. 2 shows an ISDN/PLMN Originating/Terminating Terminal connecting to a PSTN Terminating/Originating Terminal via a generalized network, which may comprise an ISDN/PLMN Network and a PSTN Network 26, wherein a new service, such as multimedia, is provided end-to-end, according to the present invention, with early and unambiguous indication of PSTN involvement to the ISDN/PLMN Terminal, i.e., before the connection is established.

FIG. 2 shows an ISDN/PLMN Originating/Terminating Terminal 20 connected to a PSTN Terminating/Originating Terminal 21 via an ISDN/PLMN Network 22 (which may include the GMSC 10 of FIG. 1) and a PSTN Network 23 (which may be part of the network 15 of FIG. 1) wherein a new service, such as multimedia, is to be provided end-to-end. The ISDN/PLMN Terminal 20 is connected to the ISDN/PLMN Network 22 by means of a signal line 24. The ISDN/PLMN Network 22 is connected to the PSTN Network 23 by a signal line 25. The PSTN network 23 is connected to the PSTN Terminal 21 by a signal line 26. It should be realized that, for purposes of establishing a multimedia call according to the invention, the ISDN/PLMN Network 22 and the PSTN Network 23 should actually appear to the end users as one network and, for purposes of the present disclosure, could be viewed as one seamless network as shown by a generalized network 27. From that perspective, there could be many different network elements intermediate the terminals 20, 21 and that only the most important are shown for purposes of illustrating the environment of the invention.

According to the teachings of the present invention, Forward/Backward Call W Indicators and the Progress Indicator (PI) of ISUP messages are used on signal lines 24, 25, 26 in call control signals, such as for setting up a mobile multimedia call, to indicate the involvement of a PSTN terminal during the setup process, i.e., before the actual connection is finally set up for service communication (e.g., multimedia) between them. In the case illustrated, the terminal 21 is a PSTN terminal connecting via the PSTN network 23. Either Terminal 20 or 21 can initiate the call setup procedure with a first forward call indicator, i.e., from the ISDN/PLMN terminal 20 on the respective line 24, 25 to the ISDN/PLMN network 22, or from the PSTN terminal 21 on the line 26, 25 toward the ISDN/PLMN network 22. The ISDN/PLMN network 22 may include an originating/terminating MSC. The network 22 responds by providing a second forward call indicator signal on the respective line 25 or 24 toward the terminating terminal. The terminating terminal provides a first backward call indicator on the respective line 26 or 24 toward the ISDN/PLMN network 22 which in turn provides a second backward call indicator on the respective line 25 or 24 toward the originating terminal. According to the invention, if either the originating or terminating terminal is connecting via a PSTN 23, it will so indicate during the above described setup procedure in either the first or a subsequent forward or backward call indicator signal, respectively. This will be relayed by the ISDN/PLMN network 22 to the respective terminating or originating ISDN/PLMN terminal which, in either event, receives the indication of the other connecting via the PSTN. The ISDN/PLMN terminal receiving such an indication during call setup (e.g., terminal 20 in FIG. 2) can then immediately recognize the unambiguous fact that a PSTN Terminal is involved in the call setup and can immediately respond by correctly setting up for use of an appropriate and compatible communication format.

The above method can be used for setting up a multimedia call in a mobile telephone network. A terminal receiving a setup message of the above described type has means for checking for an indication of a public switched telephone network connecting to the originating/terminating terminal. If such is determined to be the case, a compatible connection is setup by setup means in each terminal. This is done from the outset between the originating W terminal and the terminating terminal, i.e., in response to either terminal indicating it is connecting via the public switched telephone network.

The PI is already defined and described in ISDN and PLMN Recommendations. Highlights of the protocols relating to the PI for an ISDN User-Network Interface are described in FIGS. 3, 5, 5A and 5B. FIGS. 4, 6, 6A and 6B are similar and relate to the PLMN radio interface. FIGS. 3, 5, 5A and 5B describe the coding of Forward/Backward Call Indicators of ISUP messages and the way they are mapped to PI.

Referring now to FIGS. 3 and 5, 5A and 5B, the organization and coding of the Progress Indicator for an ISDN User-Network Interface are shown for different setup messages for CS ISDN as found in ITU-T Q.931. The purpose of the PI IE is to describe an event, which has occurred during the life of a call. The IE may occur two times in a message. The maximum length of this information element is four octets.

The followings is a list of important (from a PI IE point of view) outband setup messages used for Circuit Switched (CS) Call Control (CC) in the user-network interface:

ALERTING: This message is sent by the called user to the network and by the network to the calling user, to indicate that called user alerting has been initiated. The message has global significance and can optionally carry the PI IE in both the directions. PI IE is included in the event of interworking.

CALL PROCEEDING: This message is sent by the called user to the network or by the network to the calling user to indicate that requested call establishment has been initiated and no more call establishment information will be accepted. The message has local significance and can optionally carry the PI IE in both the directions. PI IE is included in the event of interworking.

CONNECT: This message is sent by the called user to the network and by the network to the calling user, to indicate call acceptance by the called user. The message has global significance and can optionally carry the PI IE in both the directions. PI IE is included in the event of interworking or in connection with the provision of in-band information/patterns.

PROGRESS: This message is sent by the user or the network to indicate the progress of a call in the event of interworking or in relation with the provision of in-band information/patterns. The message has global significance and must carry the PI IE in both the directions.

SETUP: This message is sent by the calling user to the network and by the network to the called user to initiate call establishment. The message has global significance and can optionally carry the PI IE in both the directions. PI IE is included in the event of interworking or in connection with the provision of in-band information/patterns.

SETUP ACKNOWLEDGE: This message is sent by the network to the calling user, or by the called user to the network, to indicate that call establishment has been initiated, but additional information may be required. The message has local significance and can optionally carry the PI IE in both the DIRECTIONS. PI IE is included in the event of interworking or in connection with the provision of in-band information/patterns.

Referring now to FIGS. 4, 6, 6A and 6B, Progress Indicator details are shown for a PLMN radio interface. Codewords for PI IE and organization of different setup messages for CS PLMN, as found in GSM 04.08, are outlined below. It may be assumed that the corresponding 3G mobile specification TS 24.008 will be derived from GSM 04.08. The purpose of the PI IE is to describe an event, which has occurred during the life of a call. As shown, the PI is a type 4 information element with a length of 4 octets.

The following is a list of important outband setup messages (from a PI IE point of view), used for CS CC in the PLMN radio interface, as found in GSM 04.08;

ALERTING: This message is sent by the network to the calling mobile station and by the called mobile station to the network, to indicate that the called user alerting has been initiated. The message has global significance and can optionally carry PI IE in the network to MS direction only. The PI IE may be included by the network in order to pass information about the call in progress, e.g., in the event of interworking; and/or to make the MS attach the user connection for speech.

CALL PROCEEDING: This message is sent by the network to the calling mobile station to indicate that the requested call establishment information has been received, and no more call establishment information will be accepted. The message has local significance and can optionally carry PI IE. The PI IE may be included by the network in order to pass information about the call in progress, e.g., in the event of interworking; and/or to make the MS attach the user connection for speech.

CONNECT: This message is sent by the network to the calling mobile station and by the called mobile station to the network to indicate call acceptance by the called user. The message has global significance and can optionally carry PI IE in the network to MS direction only. The PI IE may be included by the network in order to pass information about the call in progress, e.g., in the event of interworking; and/or to make the MS attach the user connection for speech.

PROGRESS: This message is sent from the network to the mobile station to indicate the progress of a call in the event of interworking or in connection with the provision of in-band information/patterns. The message has global significance and must carry PI IE.SETUP: This message is sent by the network to the mobile station and to initiate a mobile terminated call establishment and from the mobile station to the network to initiate a mobile originating call establishment. The message has global significance and can optionally carry PI IE in the network to MS direction only. The PI IE may be included by the network in order to pass information about the call in progress, e.g., in the event of interworking; and/or to make the MS attach the user connection for speech.

Figures 3, 4, 8:
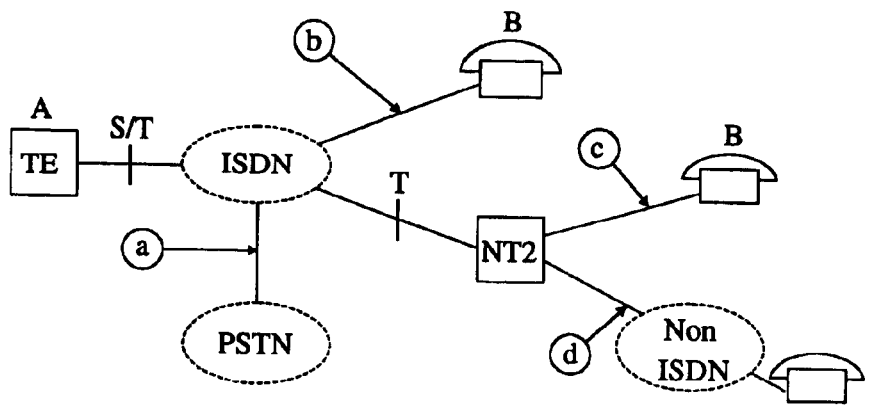
FIG. 3 shows the prior art Progress Indicator Information Element (PI IE) as found in Q.931.
FIG. 4 shows the prior art Progress Indicator Information Element (PI IE) as found in GSM 04.08.
FIG. 8 shows different internetworking scenarios for sending Progress Indicators.

The concept of setting PI is shown in FIG. 8 (Annex G/Q.931), where four cases of interworking are defined:
  a) interworking with another network;
  b) interworking with a non-ISDN user connected to ISDN;
  c) interworking with non-ISDN equipment within the calling or called user's premises;
  d) interworking with another network behind the T reference point.

Regarding the above four cases, the following applies for calls from A:
  case a)—progress indicator No. 1 sent to A;
  case b)—progress indicator No. 2 sent to A;
  case c)—progress indicator No. 2 sent to A (location sub-field=private network);
  case d)—progress indicator No. 1 sent to A (location sub-field=private network).

Similarly, the following applies for calls towards A:
  case a)—progress indicator No. 1 sent to A;
  case b)—progress indicator No. 3 se nt to A;
  case c)—progress indicator No. 3 sent to A (location sub-field private
  case d)—progress indicator No. 1 sent to A (location sub-field private network).

The use of progress indicator No. 4 is exemplified in the following scenarios associated with the Call Forwarding supplementary service. If a call is originated from user A to user B, then as stated above, in the interworking cases b) and c) (see FIG. 10), progress indicator No. 2 shall be sent to user A to indicate that interworking has occurred. If subsequently the call is forwarded from user B to user C, and user C is an ISDN user, progress indicator No. 4 shall be sent to user A.

According to the present invention, the use of Forward/Backward Call Indicators and the PI of ISUP messages in mobile multimedia call control in PLMN/ISDN involving a PSTN circuit is described below separately for PSTN terminating and originating cases:

PSTN Terminating Case (Automatic Fallback from UDI/RDI to 3.1 kHz)

Figure 9A:
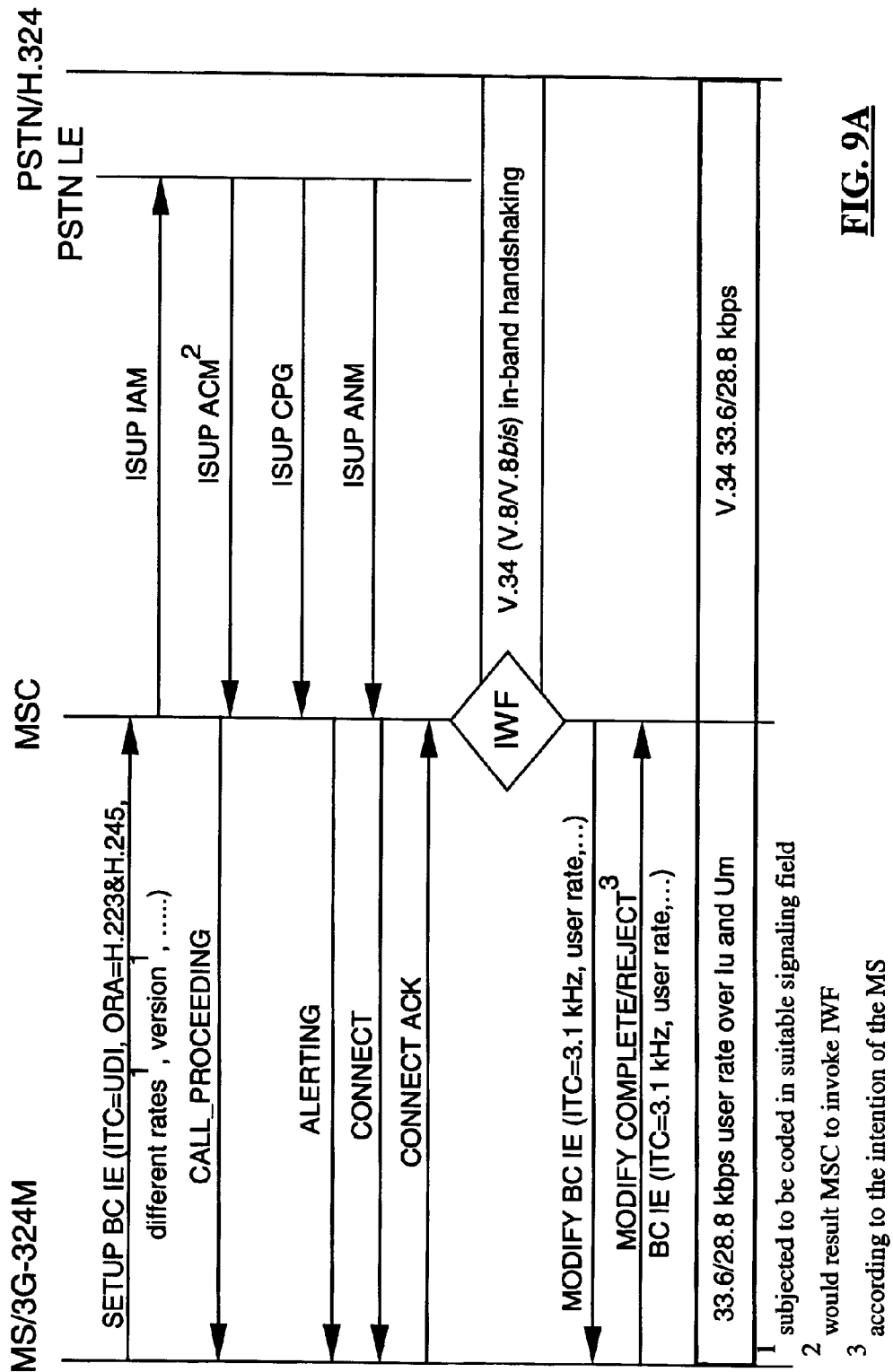
FIG. 9A shows internetworking outband multimedia call setup signalling sequences for PSTN terminating case, according to the invention.

FIG. 9A shows the setup message transactions between different nodes, involving the PSTN as an end terminal, to establish a multimedia connection. The basic assumptions in this regard are:
  the called user will set the PI number 2, when noticed PSTN involvement as called terminal/equipment, attached to the user, in backward:
    CALL PROCEEDING, ALERTING, CONNECT message when subjected to state change or
    PROGRESS message when not subjected to state change,
  the terminating digital node will set the ISDN Access Indicator bit of Backward Call Indicators ISUP ACM (mandatory)/CPG (optional)/ANM (optional)/CON (mandatory) according to the terminating access,
  the originating MSC will check the ISDN Access Indicator bit of Backward Call Indicators and the PI indication in all backward ISUP messages and a sensing of the involvement of the PSTN as the called terminal will force the node to
    invoke IWF and send V.8N.8bis signalling corresponding to 3G324M support and
    initiate an In Call Modification procedure with the calling MSC to fallback to PSTN compatible service requirement.

The calling MS will initiates the multimedia call with the usual BC IE parameter (UDI/RDI as ITC, H.223 & H.245 as ORA and other required parameters) in the SETUP message, which is a service requirement for an end-to-end PLMN/ISDN connection.

If the called terminal is a PSTN equipment connected to a ISDN user, the ISDN user should set PI number 2 as the Progress Description of PI IE in backward CALL PROCEEDING, ALERTING, CONNECT or PROGRESS messages, depending on the situation. PI number 2 in any of these messages will be mapped to a value corresponding to terminating access non-ISDN (1) for the ISDN Access Indicator bit of the Backward Call Indicators of the backward ISUP ACM (mandatory)/CPG (optional)/ANM (optional) message from the terminating ISDN LE. At the same time the ISUP messages should carry a PI in the Access Transport Parameter towards the calling end.

On the other hand, if the called end is a PSTN user connected to ISDN/PSTN LE, the LE sets the ISDN Access Indicator bit of Backward Call Indicators to a value corresponding to terminating access non-ISDN (1) in the backward ISUP ACM (mandatory)/CPG (optional)/ANM (optional) message.

Receiving any of the mentioned backward ISUP messages, the originating is MSC will first check the ISDN Access Indicator bit of the Backward Call Indicators Parameter and the possible PI in Access Transport Parameter of backward ISUP messages. The MSC will know that the called end is a PSTN terminal either because it finds the value of the ISDN Indicator to be terminating access non-ISDN (1) or if PI number 2 is in the PI IE.

Figure 9B:
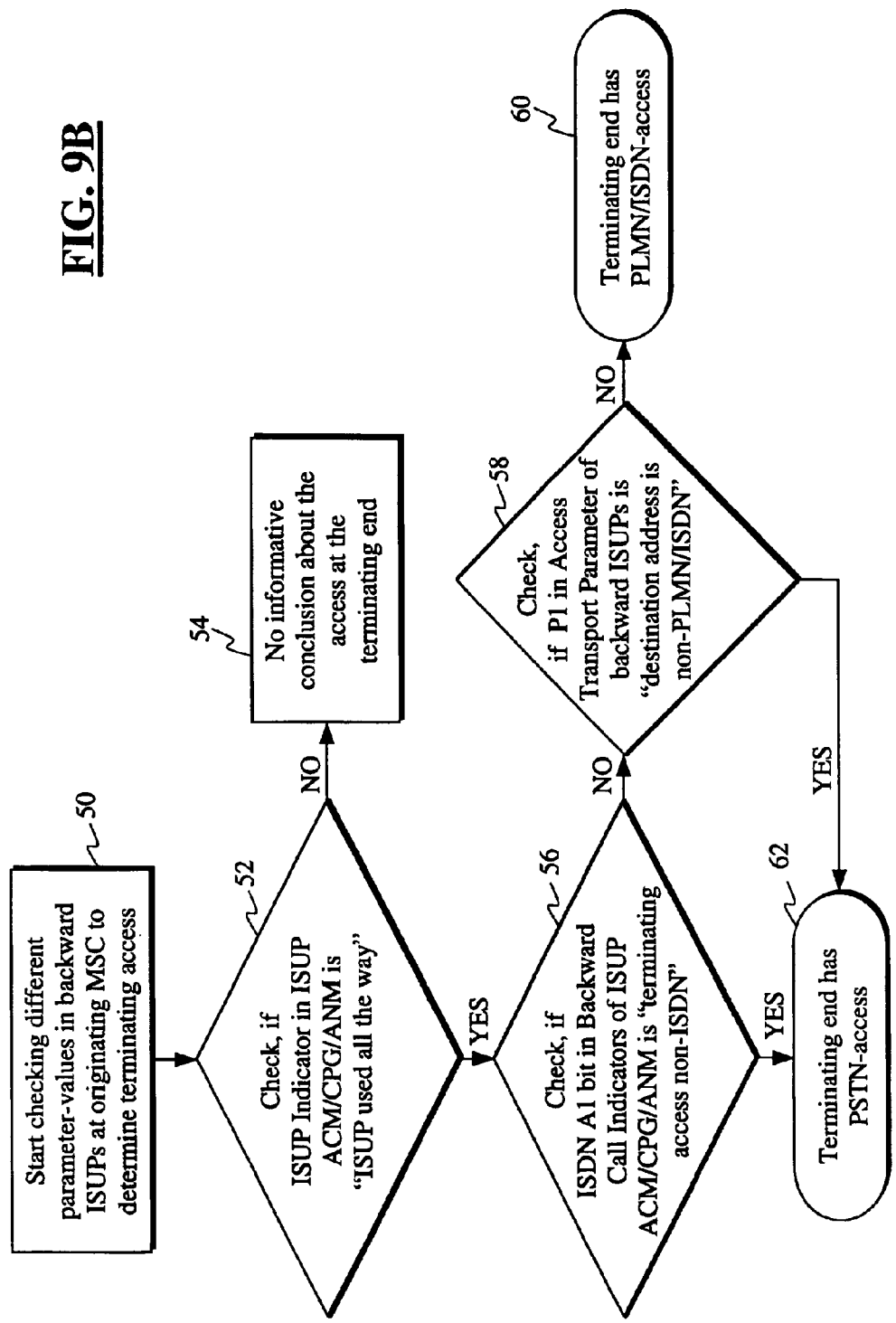
FIG. 9B shows a flow chart for checking the sequence of different parameters of backward ISUPs in an originating MSC to determine at the nature of the access at the terminating end, especially for PSTN-terminated calls, according to the present invention.

A series of steps is shown in FIG. 9B for execution in the originating MSC for finding out whether or not there is a PSTN termination. After the multimedia call set up has commenced with the set up message, and after the MSC has sent out the ISUP IAM message, the originating MSC starts checking different parameter-values in backward ISUPs ACM, CPG and ANM to determine the nature of the terminating access as shown in steps 50, 52. A given ISUP indicator may be checked in the MSC to determine if "ISUP is used all the way". If not, no informative conclusion about the access at the terminating end can be made at this point as indicated by a step 54. However, if ISUP is used all the way, then another check is made to see if the ISDN AI bit in the backward call indicators of ISUP ACM/CPG/ANM indicates "terminating access non-ISDN" as shown in a step 56. If not, the PI in the access transport parameter of backward ISUPs is checked for "destination address is non-PLMN/ISDN" as shown in a step 58. If not, the terminating end has PLMN/ISDN-access as concluded in a step 60. However, if the IA bit indicates "terminating access non-ISDN" or the PI indicates "destination address is non-PLM/ISDN", then it can be determined in a step 62 that the terminating end has PSTN-access.

Knowing PSTN involvement as the called terminal, the originating MSC will invoke IWF and will put an IWF V.34 modem on line as shown in FIG. 9A. The modem will start sending inband V.8, or optionally V.8bis, signals indicating 3G324M support as the Call Function to the called end. V.8 signalling as a response from the called end would force the start of V.8 signalling sent from the IWF, if it was sending V.8bis signals. A response signal indicating support of H.324 in the called end will lead to complete V.34 modem handshaking between the originating MSC and the called terminal, resulting in a 28.8 or 33.6 kbps channel, depending on modem negotiation, in between. On the is other hand, no signal from the called end indicating the support of H.324 in w the called end would give the option to MSC IWF to close the call or to fallback to speech.

At the same time, when the MSC IWF knows about the support of H.324 in the called end, it will initiate an In Call Modification procedure with the calling MS to fallback to PSTN compatible multimedia call service requirements (3.1 kHz Ext. PLMN as ITC, user rate, etc.).

This way the existence of the PSTN as the called end will be noticed outband to the originating end and thus guide the setup to inband signalling, which is a must for PSTN involvement. As a firm notification about PSTN involvement as the called end is known prior to inband signalling, inband handshaking would succeed, if there are no other problems. Moreover, the calling end does not need to know the service requirement for a multimedia call by the called end, as the present invention allows automatic fallback from UDI/RDI to 3.1 kHz.

PSTN Originating Case (Automatic Fallback from UDI/RDI to 3.1)

A mobile terminating (MT) PSTN originating call is also discussed in TS 26.112 for both single and multinumbering schemes. The present invention can improve the performance of a multimedia Call Control (CC) procedure only for the single numbering case, where the terminating MSC gets no service definition or an incomplete service definition from the originating side. So, a PSTN originating call for only the single numbering scheme is described below.

Single Numbering Scheme

Figure 10A:
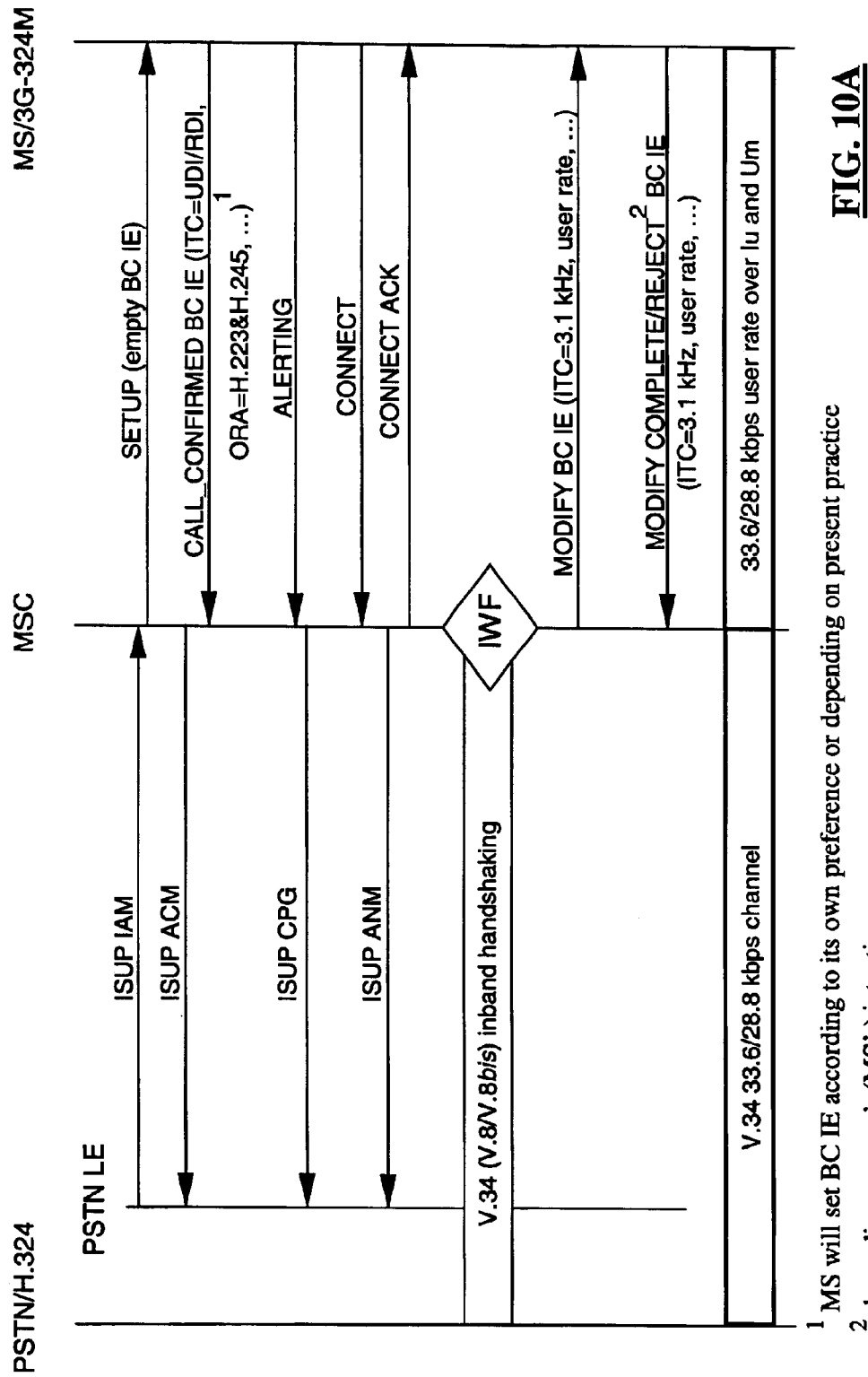
FIG. 10A shows internetworking outband multimedia call setup signalling sequences for PSTN originating case, according to the invention.

FIG. 10A shows the setup message transactions between different nodes for a PSTN originating multimedia call for a single numbering scheme. The basic assumptions in this regard are:

the calling user will set PI number 3, when PSTN involvement is noticed as the calling terminal/equipment, connected to the user, in the forward
SETUP message when subjected to a state change or
PROGRESS message when not subjected to a state change, the originating digital node will set the mandatory ISDN Access Indicator bit of the Forward Call Indicators of the ISUP IAM message according to the originating access, the terminating MSC will check the ISDN Access Indicator bit of the Forward Call Indicators and the PI indication in the forward ISUP IAM message. Upon sensing PSTN involvement as the calling terminal and receiving a multimedia service requirement from the called MS in the CALL CONFIRMED message, the MSC will
invoke IWF and expect V.8N.8bis signalling corresponding to H.324 support and
initiate In Call Modification/procedure with called MSC to fallback to PSTN compatible service requirement.

When a multimedia call is initiated by a PSTN terminal/equipment connected to ISDN user premises, the ISDN user will set PI number 3 as the Progress Description in the forward SETUP or PROGRESS message depending on the situation. PI number 3 in any of these messages will be mapped to a value corresponding to originating access non-ISDN (1) for the ISDN Access Indicator bit of the mandatory Forward Call Indicators of the forward ISUP IAM message from the originating ISDN LE. At the same time the ISUP IAM message will carry a PI in the Access Transport Parameter towards the called end.

On the other hand, if the calling end is a PSTN user connected to an ISDN LE, the LE sets the ISDN Access Indicator bit of the mandatory Forward Call Indicators to a value corresponding to originating access non-ISDN (1) in the forward ISUP IAM message.

The ISUP IAM will carry no service definition or partial service definition, as it is generated in a PSTN terminal. The terminating MSC will send the SETUP message with an empty BC IE to the called MS.

At the same time, the terminating MSC will first check the ISDN Access Indicator bit of the mandatory Forward Call Indicators Parameter in the ISUP IAM and the possible PI in the Access Transport Parameter of the forward ISUP message. The MSC will know that the calling end is a PSTN terminal either if it finds the value of the ISDN Access Indicator bit to be originating access non-ISDN (1) or if PI number 3 is in the PI IE.

The called MS will set the usual PLMN/ISDN compatible multimedia service requirement as BC IE (UDI/RDI as ITC, H.223 & H.245 as ORA and other required parameters) of the backward CALL CONFIRMED message. Receiving the backward message and based on stored information about PSTN involvement as called end, the terminating MSC will invoke IWF and put an IWF V.34 modem online. The modem will be waiting to receive inband V.8, or optionally V.8bis, signals indicating H.324 support as the Call Function in the called end. V.8 signalling from the calling end will force a condition where the IWF modem receives V.8 signalling from the called end, if it was conditioned to receive V.8bis signals initially. V.8N.8bis signal indicating support of H.324 in the calling end will lead to complete V.34 modem handshaking between the calling end and the terminating MSC, resulting in a 28.8 or 33.6 kbps channel, depending on modem negotiation, in between. On the other hand, no signal from the calling end indicating the support of H.324 in the calling end will give the option to MSC IWF to close the call or to fallback to speech.

At the same time, when the MSC IWF knows about the support of H.324 in the calling end, it will initiate an In Call Modification procedure with the called MS to fallback to PSTN compatible multimedia call service requirements (3.1 kHz Ext. PLMN as ITC, user rate, etc.). The called MS can accept or reject the fallback sending appropriate response message.

This way, with the prior knowledge about PSTN involvement as the called end received outband, the handshaking for multimedia call is done inband and setup is modified according to the output of inband signalling. At the same time, the called MS has the flexibility to decide the mode of the call and accept or reject the multimedia call. Moreover, the called MS does not need to know about call origination, as the fallback from UDI/RDI to 3.1 kHz case is automatic here.

FIG. 10B shows a flow chart of the checking sequence of different parameters in forward ISUPs in the terminating MSC to determine the access at the originating end for a PSTN-originated call.

In this case, after receiving an ISUP IAM such is shown in FIG. 10A, a step 90 is executed in the terminating MSC to start checking different parameter-values in forward ISUPs to determine the originating access. For instance, as shown in a step 92, a check is made if the ISDN AI bit in the forward call indicators of ISUP IAM messages is "originating access non-ISDN". If so, the originating end has PSTN-access and the terminating MSC "knows" of this fact for purposes of the present invention as shown in a step 94 as discussed above. If not, a check is made in a step 96 to determine if the PI parameter in the access transport ISUPs is "originating address is non-PLMN/ISDN". If so, once again the terminating MSC has "knowledge" that the originating end has PSTN-access, as indicated in the step 94, for purposes of the present invention. If not, it similarly "knows" that the originating end has PLM/ISDN access as indicated in a step 98 and a return can then be made to other processing tasks unrelated to the interworking function of the present invention.

Although the invention has been shown and described with respect to a best mode embodiment thereof, it should be understood by those skilled in the art that the foregoing and various other changes, omissions and additions in the form and detail thereof maybe made therein without departing from the spirit and scope of the invention.

What is claimed is:

1. Method for setting up a multimedia call between an originating or terminating mobile terminal and a corresponding terminating or originating nondigital public switched telephone network (PSTN) terminal via a mobile switching center (MSC) in a mobile telephone network, comprising the steps of:

checking parameter values in backward or forward ISDN user part (ISUP) messages at said MSC for an indication of originating or terminating non-ISDN access by a PSTN local exchange (LE) connecting to said terminating or originating non-digital PSTN terminal, and setting up a compatible connection between said originating or terminating mobile terminal and said corresponding terminating or originating non-digital PSTN terminal via said MSC and said PSTN LE in the presence of said indication of said originating terminal or said terminating terminal connecting to said PSTN LE to support said multimedia call, wherein a data rate for said compatible connection is agreed by both the originating and the terminating terminals.

2. The method of claim 1, wherein said compatible connection is established by first connecting said intermediate MSC to said originating or terminating nondigital PSTN terminal with an analog connection for determining said data rate to use between said nondigital PSTN terminal and said mobile terminal, by second notifying said mobile terminal of said data rate and receiving agreement therefrom, and by third establishing said compatible connection as an analog connection with said agreed data rate between said nondigital PSTN terminal and said mobile terminal.

3. Method for setting up a multimedia call between an originating mobile terminal and a terminating public switched telephone network (PSTN) non-ISDN terminal via an originating mobile switching center (MSC) in a mobile telephone network and via at least one PSTN local exchange (LE) including a terminating PSTN LE to which said PSTN terminal is connected, comprising the steps of:

initiating said multimedia call from said originating mobile terminal by providing an originating first forward message from said originating mobile terminal to said originating MSC, checking said originating first forward messages in said originating MSC for an indication of multimedia call by said originating mobile terminal, providing, in response to said first forward message, a second forward message from said originating MSC to said terminating PSTN LE, providing, in response to said second forward message, a plurality of backward messages from said terminating PSTN LE connected to said terminating PSTN terminal to said originating MSC at least one of said plurality of backward messages indicating said PSTN non-ISDN terminal connected to said PSTN LE, and checking said backward messages from said terminating PSTN LE for said at least one of said plurality of backward messages indicating the presence of said PSTN non-ISDN terminal connected to said PSTN LE, setting up a compatible analog connection between said originating mobile terminal and said terminating PSTN non-ISDN terminal in the presence of said indication of said terminating PSTN non-ISDN terminal connecting to said PSTN LE to support said multimedia call.

4. The method of claim 3, wherein said compatible analog connection is setup by first connecting said intermediate MSC to said terminating PSTN non-ISDN terminal with an analog connection for determining a data rate to use between said terminating PSTN non-ISDN terminal and said mobile terminal, by second notifying said originating mobile terminal of said data rate and receiving agreement therefrom, and by third setting up said compatible analog connection with an agreed data rate between said terminating PSTN non-ISDN terminal and said originating mobile terminal.

* * * * *

UNITED STATES PATENT AND TRADEMARK OFFICE
CERTIFICATE OF CORRECTION

| | |
|---|---|
| PATENT NO. | : 6,987,974 B1 |
| APPLICATION NO. | : 09/715839 |
| DATED | : January 17, 2006 |
| INVENTOR(S) | : Miraj Mostafa and Harri Honko |

It is certified that error appears in the above-identified patent and that said Letters Patent is hereby corrected as shown below:

Title Page in Section (56) under Foreign Patent Documents, the following patents should be added:

WO    9826621    6/1998

EPO    0738091    10/1996

Signed and Sealed this

Sixteenth Day of September, 2008

JON W. DUDAS
*Director of the United States Patent and Trademark Office*